United States Patent [19]

Van Eenam

[11] Patent Number: 4,604,163

[45] Date of Patent: Aug. 5, 1986

[54] VISCOSITY MODIFIERS FOR GRAFTED STARCH POLYMER SOLUTIONS

[75] Inventor: Donald N. Van Eenam, Des Peres, Mo.

[73] Assignee: Monsanto Company, St. Louis, Mo.

[21] Appl. No.: 788,360

[22] Filed: Oct. 17, 1985

Related U.S. Application Data

[60] Division of Ser. No. 585,461, Mar. 2, 1984, which is a continuation-in-part of Ser. No. 500,211, Jun. 2, 1983, abandoned.

[51] Int. Cl.$^4$ .............................................. D21H 3/28
[52] U.S. Cl. .................................... 162/175; 428/532; 162/168.1; 162/168.2; 162/168.3
[58] Field of Search .................. 162/175, 168.1, 168.2, 162/168.3, 164.6; 428/532

[56] References Cited

U.S. PATENT DOCUMENTS

| | | | |
|---|---|---|---|
| 4,263,094 | 4/1981 | Logan et al. | 162/175 |
| 4,330,365 | 5/1982 | Tessler | 162/175 |
| 4,388,150 | 6/1983 | Sunden et al. | 162/175 |

*Primary Examiner*—James J. Bell
*Attorney, Agent, or Firm*—Jon H. Beusen; W. J. Farrington; A. H. Cole

[57] ABSTRACT

Grafted starch polymer solution of a low viscosity through the use of cinnamic acid material. The cinnamic acid material is incorporated into the grafted starch polymer which is prepared from starch and vinyl monomer, preferably acrylamide.

5 Claims, No Drawings

VISCOSITY MODIFIERS FOR GRAFTED STARCH POLYMER SOLUTIONS

BACKGROUND OF THE INVENTION

CROSS REFERENCE TO RELATED APPLICATION

This is a division of application Ser. No. 585,461, filed Mar. 2, 1984. which is a continuation-in-part of copending application Ser. No. 500,211, filed June 2, 1983, abandoned.

FIELD OF THE INVENTION

The present invention relates to grafted starch polymer solutions and, more particularly, to a material which reduces the viscosity of grafted starch copolymer solution. Furthermore, the present invention relates to a process of preparing lower viscosity grafted starch polymer solutions using the viscosity reducing materials of the present invention and the use of these low viscosity grafted starch polymer solutions as dry strength additives for fibrous substrates such as paper.

DISCUSSION OF THE PRIOR ART

Starch based polymers, more particularly grafted starch polymers, have been found useful as adhesives, coatings, and resins useful for improving the properties of paper. Starch based polymers are applied as solutions, typically aqueous. The use of starch based polymers has been hindered because of the generally high viscous nature of the solutions containing such starch polymers. Various procedures to reduce the viscosity of a starch based polymer solution have been utilized. One such method involves raising the temperature of the starch solution. Another method is to reduce the overall percent solids of the starch polymer in solution. Both of these alternatives are economically disadvantageous. Heating and maintaining the solution at an elevated temperature requires the use of complicated equipment. The use of more dilute solutions of starch polymers is disadvantageous since it would require the application of larger amounts of solution to obtain the necessary amount of polymer application and would also require the transportation for more dilute solutions which is expensive.

Another method of reducing the viscosity of a starch based polymer solution is through the use of enzyme modified starch which reduces the overall viscosity of the starch solution. While this method is advantageous for certain uses, it is sometimes desirous and essential that the starch not be modified with enzyme prior to use.

SUMMARY OF THE INSTANT INVENTION

The present invention overcomes the above discussed disadvantages and other deficiencies of previous methods of reducing the viscosity of grafted starch polymer solutions through the use of a viscosity reducing material. The viscosity reducing material of the present invention is a cinnamic acid material which can be cinnamic acid or derivatives thereof, such as cinnamyl alcohol, various salts, including quaternary ammonium salts and amines of cinnamic acid and derivatives wherein the phenyl group contains substitutes. This viscosity reducing material is incorporated into the grafted starch polymer in an amount sufficient to significantly reduce the viscosity of the resulting grafted starch polymer solution. The specific amount of viscosity reducing material will be dependent upon the type of starch used to prepare the grafted starch polymer, e.g., enzyme or nonenzyme modified starch, the specific percent solids of the particular grafted starch polymer solution, and the desired viscosity. Enzyme converted starch grafted polymers have a lower viscosity and thus may require a lesser amount of the viscosity reducing material to achieve desirable viscosity than would be required with a nonenzyme modified starch grafted polymer. Furthermore, the greater the percent solids of the grafted starch polymer in solution, the greater the amount of viscosity reducing material required to achieve the desired viscosity. It has been found that the viscosity reducing material as defined above will effect a reduction in viscosity of grafted starch polymer solutions at various concentration gradients and whether prepared from enzyme or nonenzyme modified starches.

It has been found that the reduced viscosity grafted starch polymer solution prepared with the viscosity reducing materials of the present invention are particularly useful as dry strength resins for treating fibrous substrates such as paper. Preferably, the grafted starch polymer useful for treating paper is prepared from acrylamide and a nonenzyme modified starch.

DESCRIPTION OF THE PREFERRED EMBODIMENTS

The present invention generally relates to grafted starch polymers and, more particularly to grafted starch polymer solutions wherein the viscosity is decreased through the use of a viscosity reducing material.

The grafted starch polymer is typically prepared by the graft polymerization of a vinyl monomer on to a starch substrate. As is well known in the art, there are various free radical polymerization methods useful for grafting vinyl monomers to starch, e.g., radiation, redox based free radical polymerization and mechanical fission. One particularly preferred method involves preparing a solution of the starch and vinyl monomers, adding thereto an appropriate free radical catalyst, and then carrying out the polymerization below the pasting temperature of the starch. Typical free radical catalysts which may be used are hydrogen peroxide, solution soluble organic peroxides and hydroperoxides, persulfates, and ceric ion. An activator, which is typically a mild reducing agent can also be added along with the catalyst. A typical activator disclosed in the art is sodium formaldehyde sulfoxalate. All of these methods are well-known to those skilled in the art and require no further discussion herein.

Starches useful in preparing the grafted starch polymers of the instant invention include various carbohydrates such as, for example, indian corn starch, rice starch, waxy maize starch, waxy sorghum starch, tapioca starch, wheat starch, potato starch, pearl starch and sweet potato starch, and derivatives thereof. The derivatives include oxidized starches, hydroxyalkylated starches, carboxyalkylated starches, various solubilized starches, enzyme modified starches, etc. Generally, any starch can be used from which the vinyl monomers can be polymerized thereupon.

Vinly monomers useful for the practice of the present invention include the various organic compounds containing a vinyl group which is available for polymerization to produce vinyl polymeric segments from the starch. The preferred vinyl monomers of the present invention is acrylamide and, more preferably, at least 50 weight percent of the vinyl polymeric segment free radically grafted from the starch substrate is acrylamide monomer residue. The remaining weight percent of the vinyl polymeric segment may be mixtures of other vinyl monomers. Preferably, these other vinyl monomers may be used to provide the grafted starch polymer of the present invention with anionic or cationic charges which as is well known to those skilled in the art is useful in preparing paper by differing processes. Included among these compounds are styrene and substituted styrenes such as vinyl toluene, α-methyl styrene and chlorostyrene; compounds having the acrylic group as the polymerizable nucleus, such as acrylic and methacrylic acids, and esters thereof (including the methyl, ethyl, and butyl esters), acrylamide, acrylonitrile; vinyl chloride; vinyl acetate and other vinyl esters; vinyl pyridine and vinyl pyrrolidone; vinyl ketones; vinylidene compounds, such as vinylidene chloride allylidene compounds such as allylidiene diacetates; conjugated diene monomers such as butadiene-1,3, isoprene, chlorobutadiene-1,3 and so on. Other vinyl-type monomers useful are those which will impart a cationic charge to the grafted starch polymers, such a diallylamine and its respective salts, N-alkyl diallylamine and its respective salts, diallyl dialkyl ammonium quaternary salts, N,N-dialkylaminoalkyl acrylate and methacrylate and their respective salts, N,N-dialkylaminoalkyl acrylamide and methacrylamide and the respective salts and Ar-vinylbenzyldialkyl amine and the respective salts. It should be noted that the vinyl monomers used to prepare the grafted starch polymer of the present invention shall not include those which will impair the grafted starch polymer usefulness as a dry strength additive.

As stated above, the typical method for producing grafted starch polymers of the present invention involves preparing a solution of the starch, vinyl monomer(s) and appropriate catalyst with or without accelerator and then maintaining the temperature below the pasting temperature of the starch. Of the various useful solvents, such as water, alcohol and ethers, the preferred solvent of the present invention is water.

The final prepared grafted starch polymer will have from about ten (10) weight percent to about eighty (80) weight percent starch and from about twenty (20) weight percent to about ninety (90) weight percent vinyl polymeric segments. The preferred grafted starch polymer will have from about thirty (30) weight percent to about seventy (70) weight percent vinyl polymeric segments and from about thirty (30) weight percent to about seventy (70) weight percent starch. The preferred catalyst for preparing the grafted starch polymer is a persulfate such as ammonium persulfate.

The novel viscosity reducing material of the present invention is a cinnamic acid material.

For the purpose of the present invention, the term "cinnamic acid material" shall mean cinnamic acid or suitable derivates thereof, such as cinnamyl alcohol, the various salts, including quaternary ammonium salts, amines, amides and other derivatives such as wherein the phenyl group contains substituent(s) with the sole proviso being that any such modification of the cinnamic acid not eliminate the basic ability of the material to be an effective viscosity reducing agent, the preferred materials being cinnamic acid, cinnamyl alcohol, cinnamic amide and the various salts of cinnamic acid. By "derivative" it is meant a compound incorporating the backbone structure of cinnamic acid (Ph—CH═CH—CR$_3$) with Ph representing a phenyl radical and R$_3$ representing from 1 to 3 mono-or di- valent groups singly, doubly, or triply bonded to the carbon, such as, ketonic oxygen, nitrogen (as in forming a nitrile group), hydrogen, hydroxyl groups, amine groups, amide groups, or mixtures thereof.

The viscosity reducing material of the present invention is generally added prior or during the polymerization between the vinyl monomer and the starch.

It has been determined that the viscosity reducing material reduces the overall viscosity of a grafted starch polymer solution even when added in minimal amounts. Thus the amount of the viscosity reducing material used to prepare the grafted starch polymer solution will be dependent upon the desired final viscosity. The determination of the sufficient amount of viscosity reducing material to achieve the desired viscosity can be made by one skilled in the art by typical means, generally a sufficient amount of the viscosity reducing material of the present invention is added to significantly reduce the viscosity of the grafted starch polymer solution. A significant reduction in viscosity can be as low as a 25% reduction, preferably greater than 50% with reductions of over a hundredfold being obtainable in comparison to solutions containing the same grafted starch polymer absent the viscosity reducing material at the same solids content. Furthermore, the amount of viscosity reducing material used to prepare grafted starch polymers will also be dependent upon the percent of solids in the solution and the type of starch being used.

Enzyme modified starch solutions typically have a viscosity of five hundred (500) to thirty thousand (30,000) centipoise relative to unmodified starch solutions which have a corresponding viscosity range from between one thousand (1000) and fifty thousand (50,000) centipoise with the solutions generally having solids ranging between five and fifteen percent. Thus, the amount of the viscosity reducing material of the present invention used to prepare enzyme modified starches may be significantly lower than that used to prepare unmodified starch to achieve the same desired final viscosity.

As stated above, the percent solids of the solution will also influence the amount of viscosity reducing material of the present invention used to achieve the desired viscosity. Typical prior art solutions have percent solids ranging between about five percent and about fifteen percent. While these types of solutions can be of low viscosity, the use of the viscosity reducing material of the present invention allows for a lower viscosity at the same solids level. A solution for the purpose of the present invention generally has between about five (5) and fifty (50) percent solids determined by drying a one (1) gram sample at one hundred twenty (120) degrees centigrade for one (1) hour.

It has been determined, as will be illustrated in the examples below, the viscosity reducing material of the present invention may affect the polymerization and grafting of the vinyl monomer to the starch substrate and result in an increase in the amount of residue monomer after polymerization is completed. It has been found that this increase in residue monomer can be minimized through the use of additional catalyst. However, increased amounts of catalyst may be detrimental to the properties of the final product. Thus, it is preferable to limit the amount of the viscosity reducing material of the present invention below about 10 weight percent of the total weight of grafted starch polymer, exclusive of the viscosity reducing material, being prepared and, more preferably, below 5 weight percent. The most preferable range is between about 0.05 and 2 weight percent of the grafted starch polymer being prepared, exclusive of the viscosity reducing material.

Another feature of the present invention involves the preparation of a high solids starch polymer solution from between about 10 and about 40 percent solids, preferably about 25 to about 30, while incorporating therein the viscosity reducing material of the present invention and thus obtaining a final high solids solution having a desired viscosity, for example, within the range of about one thousand (1000) and about eight thousand (8000) centipoise. The solids content of the solution is determined as stated above while viscosities can be determined by either the Gardner or Brookfield methods. Preferably, the grafted starch polymer is an aqueous solution at between about 10 and about 40 pecent solids, more preferably between about 20 and about 35 percent solids. The amount of the viscosity reducing material of the present invention used to prepare the grafted starch polymer solution will range between about 0.1 weight percent and about 10 weight percent of the grafted starch polymer, preferably between about 0.5 and about 1.5 weight percent.

As stated above, grafted starch polymer prepared in accordance with the present invention has particular applicability in the use as a dry strength resin for fibrous substrates such as paper. It is sometime desirable with dry strength resins to provide charged sites thereon to enhance the interraction between the polymer and the paper substrate. This is accomplished by providing the vinyl polymeric segments with at least about 1.5 weight percent of a charge providing vinyl monomer residue, preferably from about 2.5 to about 50 weight percent. The types of materials useful to provide an anionic charge site to grafted starch polymers would typically be ethylenically unsaturated carboxylic acids such as acrylic, maleic, itaconic and methyacrylic acid. The grafted starch polymer can also be provided with a cationic charge site through the use of various materials such as diallyl dimethyl ammonium chloride and N,N dimethylaminoethyl methacrylate.

EXAMPLES 1-14

The following examples, 1 through 14 illustrate the reduction in viscosity of a grafted starch polymer solution through the use of the viscosity reducing material of the present invention. The grafted starch polymer solutions in Examples 1 through 14 were prepared from an enzyme modified hydroxyethylated starch and acrylamide in the presence of ammonium persulfate (catalyst). Some of the examples contain the viscosity reducing materials of the present invention and/or other materials as shown in Table 1, below. All of these materials were placed into a 50 ml Erlemeyer flask which was equipped with a magnetic stirrer bar. The flask was stoppered after being nitrogen sparged and placed within a hot water bath maintained at a temperature between 70° and 80° C. for a period of about two hours. Each example was prepared by using 20 gms of 25% total solids in an aqueous solution enzyme modified hydroxyethylated starch (i.e., 5 grams solids) and 0.12 gms of the ammonium persulfate catalyst. The amount of acrylamide and the amount and type of viscosity reducing material and/or other materials used to prepare each example is indicated below in Table 1. Each of the examples were adjusted so that the final solution had about 40% total solids determined by drying a 1 gram sample at 120° C. for 1 hour.

Also provided in Table 1 are the final solution viscosities, in centipoise, for each example. The viscosities were determined by the Brookfield method. As seen in Table 1, those examples which were not prepared using the viscosity reducing material of the present invention exhibited higher viscosities, typically greater than 20,000 centipoise (see Examples 1 through 5, 7 and 10) with Example 9 having a viscosity lower than 20,000 but still relatively greater than the viscosities obtained using the viscosity reducing materials of the present invention. The remaining examples exhibited lower viscosities through the use of a viscosity reducing material.

TABLE 1

| EX. | ACRYLAMIDE (GRAMS) | VISCOSITY REDUCING MATERIALS (GRAMS) | OTHER MATERIALS (GRAMS) | VISCOSITY (CENTIPOISE) |
| --- | --- | --- | --- | --- |
| 1 | 5 | — | — | >20,000 |
| 2 | 4.5 | — | Acrylic Acid (0.5) | >20,000 |
| 3 | 4.5 | — | Crotonic Acid (0.5) | >20,000 |
| 4 | 4.5 | — | DMAEMA (0.5) | >20,000 |
| 5 | 4.5 | — | ATMAC (0.5) | >20,000 |
| 6 | 4.5 | Na Cinnamate (0.5) | — | 300 |
| 7 | 4.5 | — | Fumaric Acid (0.5) | >20,000 |
| 8 | 4.75 | Na Cinnamate (0.25) | — | 400 |
| 9 | 4.5 | — | Itaconic Acid (0.5) | 6,350 |
| 10 | 4.5 | — | N—t-BuAA (0.5) Crotonic Acid (0.25) | >20,000 |
| 11 | 4.5 | Na Cinnamate (0.25) | Na acrylate (0.25) | 320 |
| 12 | 4.75 | N,N—cinnamyl methyl pyrrolidinium chloride (0.25) | — | 525 |
| 13 | 4.75 | Allyl cinnamyl dimethylammonium chloride (0.25) | — | 1,070 |
| 14 | 4.75 | Cinnamyl alcohol (0.25) | — | 880 |

NOTES
1. DMAEMA = N,N—dimethylaminoethyl methacrylate
2. ATMAC = Allyltrimethyl ammonium chloride
3. DADMAC = diallyl dimethyl ammonium chloride
4. N—t-BuAA = N—t-butyl acrylamide

EXAMPLES 16-23

The following Examples 16 through 23 demonstrate the use of viscosity reducing materials of the present invention with grafted starch copolymer solutions prepared from vinyl monomers other than acrylamide. These examples were prepared using the same type and amount of starch and catalyst as recited for the above Examples 1 through 14, except for Examples 21 and 22 which used hydrogen peroxide as the catalyst (3.0 w/w percent based on total solids), the difference being that the vinyl monomers were other than acrylamide and are listed below in Table 2 in their respective amounts for each example. Also listed below, in Table 2, are the type and amount of viscosity reducing material and other material used to prepare each example. Furthermore, Table 2 lists the respective final solution viscosity in centipoise for each example (Brookfield method). Again, as seen from the following Table 2, those examples prepared with the viscosity reducing materials of the present invention exhibited a reduced viscosity in comparison to those examples which did not. Each of the Examples 15 through 22 were adjusted so that the final solution had about 40 percent solids.

starch and 4.54 grams of potassium persulfate in a 5 liter flask. The amount of acrylamide monomer used for each example is the remainder of five (5) grams minus the amount of cinnamic acid and other materials used for the specific examples. Each of the examples were adjusted so that the final solution had the solids content as listed in Table 3. Solids are determined as stated above for Examples 1–22. Other materials, such as maleic and acrylic acids were introduced into the polymerization of the grafted starch polymer in order to confer a charge site thereon. Thus, as stated above, is sometimes useful when the grafted starch polymers of this type are applied to a fibrous substrate such as paper. In Table 3 below, the amount of cinnamic acid which was used as the viscosity reducing material is listed along with the amount and type of other materials, the total solution solids, the solution viscosity and the residue monomer of each example.

As can be seen from Table 3, below, the acrylamide grafted starch polymer solutions containing the visocity

TABLE 2

| EX. | VINYL MONOMER (GRAMS) | VISCOSITY REDUCING MATERIALS (GRAMS) | OTHER MATERIAL (GRAMS) | VISCOSITY (CENTIPOISE) |
|---|---|---|---|---|
| 15 | Acrylic Acid (5.0) | — | — | >20,000 |
| 16 | Na Acrylate (4.75) | Na Cinnamate (0.25) | — | 400 |
| 17 | HEMA (5.0) | — | — | 225 |
| 18 | HEMA (4.75) | Cinnamyl Alcohol (0.25) | — | 65 |
| 19 | DMAEMA.H$_2$SO$_4$ (5.0) | — | — | >20,000 |
| 20 | DMAEMA.H$_2$SO$_4$ (4.75) | Cinnamyl Alcohol (0.25) | — | 1,800 |
| 21* | NVP (5.0) | — | — | 9,800 |
| 22* | NVP (4.75) | Na Cinnamate (0.25) | — | 110 |

NOTES
1. DMAEMA = N,N—dimethylaminoethyl methacrylate
2. HEMA = 2-Hydroxyethyl methacrylate
3. NVP = Vinyl-2-pyrrolidone
*These Examples used 3.0% H$_2$O$_2$ as the initiator catalyst.

EXAMPLES 23–33

The following Examples 23 through 33 illustrate the preparation of grafted starch copolymer solutions from a nonenzyme converted starch and acrylamide. In Examples 23–33, the grafted starch polymer solutions were prepared from a modified hydroxyethylated starch, cinnamic acid, vinyl monomers (as listed under other materials in Table 3) and acrylamide in the presence of potassium persulfate. All of the Examples were prepared by placing in an aqueous solution the specified quantities of the specific materials as listed below in Table 3 into a 1 liter flask equipped with a stirrer, condenser, thermometer and nitrogen purge. Each example was prepared using 50 grams of the modified hydroxyethylated starch and 0.8 grams of potassium persulfate. Examples 30–33 were prepared in a similar manner using 284 grams of the modified hydroxyethylated reducing materials of the present invention (Examples 23–31, 33 and 34) had a significant reduction of viscosity compared to the acrylamide grafted starch polymer solution not containing the viscosity reducing material of the present invention (Example 32). Furthermore, as discussed above, it can be seen as the amount of viscosity reducing material used to prepare the examples is increased, the amount of residual monomer also increases. As stated above, this may be minimized by increasing the amount of the catalyst used during the polymerization. Residual monomer is determined using a Pulse Polarography method.

TABLE 3

| EX. | CINNAMIC ACID (GRAMS) | OTHER MATERIALS (GRAMS) | SOLIDS % | VISCOSITY CENTIPOISE | RESIDUAL MONOMER (%) |
|---|---|---|---|---|---|
| 23 | .25 | — | 30.2 | 6530 | 5.61 |
| 24 | .25 | Maleic Acid (.25) | 29.8 | 430 | 14.19 |
| 25 | .25 | Acrylic Acid (.25) | 30.7 | 2900 | 6.89 |
| 26 | .25 | Itaconic Acid (.25) | 29.9 | 413 | 20.80 |
| 27 | .05 | Acrylic Acid (.20) | 30.3 | 60352 | 0.02 |
| 28 | .15 | Acrylic Acid (.10) | 30.6 | 7250 | 0.70 |
| 29 | .15 | Methacrylic Acid (.10) | 30.5 | 8190 | 0.71 |
| 30 | .05 | Acrylic Acid (.20) | 25 | 8240 | 0.07 |
| 31 | .10 | Acrylic Acid (.15) | 24.6 | 2580 | 0.19 |
| 32 | .10 | Acrylic Acid (.15) | 25 | — | 0.40 |
| 32 | — | — | 15.8 | 2425 | — |

PREPARATION OF TREATED PAPER

EXAMPLES A–C

The following examples illustrate the application of grafted polymers prepared in accordance with the present invention to paper stock.

Specifically, the paper stock was 50/50 bleached hardwood/softwood kraft at CSF 500 with 30 lbs/ton of alum at a pH of 4.5. The sheet was formed in a pilot paper machine at 50 ft/min. with a basis weight of 30 lb/3000 sq. ft. Tensile strips (used to conduct the dry strength testing) were cut cross direction from the center of the sheet. The 4×1 inch strips were tested for dry tensile strength at an extension speed of 1 inch/min. Examples A through C involve the application of the resins prepared above (Examples 23, 22 and 24, respectively), to the paper stock. In Table 4, below, the amount of the respective acrylamide grafted starch polymer examples applied to the paper and the resulting dry strength is shown. The dry strengths of the paper samples were measured according to the Technical Association of the Pulp and Paper Industry (TAPPI) standard test procedure T404-TS66 which is incorported herein by reference.

TABLE 4

| EX. | CORRESPONDING EXAMPLE TABLE 3 | APPLICATION LBS/TON | DRY STRENGTH LBS/TON |
| --- | --- | --- | --- |
| A | 23 | 3 | 9.44 ± 0.58 |
|   |   | 6 | 9.60 ± 0.66 |
|   |   | 9 | 10.1 ± 0.1 |

TABLE 4-continued

| EX. | CORRESPONDING EXAMPLE TABLE 3 | APPLICATION LBS/TON | DRY STRENGTH LBS/TON |
| --- | --- | --- | --- |
| B | 22 | 3 | 9.7 ± 0.36 |
|   |   | 6 | 9.9 ± 0.66 |
|   |   | 9 | 10.2 ± 0.59 |
| C | 24 | 3 | 9.7 ± 0.5 |
|   |   | 6 | 9.4 ± 0.5 |
|   |   | 9 | 9.1 ± 0.5 |

While the preferred embodiments have been described and illustrated, various modifications and substitutions may be made thereto within the scope of the present invention. Accordingly, it is to be understood that the present invention has been described by way of illustration and not limitation.

What is claimed is:

1. A fibrous substrate having been prepared with a solution comprised of from between about 20 and about 35 percent on a solids basis of a graft polymer comprised of from about 70 to about 30 weight percent of a starch substrate, about 30 to about 70 weight percent of vinyl polymeric segments and a viscosity reducing amount cinnamic acid material.

2. The fibrous substrate of claim 1 wherein said solution is aqueous.

3. The fibrous substrate of claim 2 wherein said aqueous solution has a viscosity within a range of between about 1000 and about 8000 centipoise.

4. The fibrous substrate of claim 3 wherein said cinnamic acid material is from about 0.1 weight percent to about 10 weight percent of the polymer.

5. The fibrous substrate of claim 4 wherein said cinnamic acid material is from between about 0.5 to about 1.5 weight percent of said polymer.

* * * * *